United States Patent [19]
Dan et al.

[11] Patent Number: 5,506,068
[45] Date of Patent: Apr. 9, 1996

[54] NON-AQUEOUS SAFE SECONDARY CELL

[75] Inventors: Pnina Dan, Rehovot; Jordan Geronov, Ganei Yehuda; Shalom Luski, Rehovot; Emil Megenitsky, Jerusalem; Doron Aurbach, Beni-Brak, all of Israel

[73] Assignee: Tadiran, Ltd., Holon, Israel

[21] Appl. No.: 205,037

[22] Filed: Mar. 1, 1994

[51] Int. Cl.$^6$ .................................................. H01M 10/40
[52] U.S. Cl. ............................ 429/50; 429/198; 429/217; 320/14; 427/126.3; 427/375; 427/388.5
[58] Field of Search .................................... 429/194, 198, 429/217, 50; 427/126.3, 122, 375, 388.5; 320/14

[56] References Cited

U.S. PATENT DOCUMENTS

| | | |
|---|---|---|
| 3,907,597 | 9/1975 | Mellors . |
| 3,947,289 | 3/1976 | Dey et al. . |
| 4,071,665 | 1/1978 | Garth ........................................ 429/197 |
| 4,086,403 | 4/1978 | Whittingham et al. .................. 429/194 |
| 4,093,783 | 6/1978 | Maas, Jr. et al. ............................ 429/5 |
| 4,133,856 | 1/1979 | Ikeda et al. ................................ 264/63 |
| 4,205,432 | 6/1980 | Mrha et al. ........................... 429/217 X |
| 4,279,972 | 7/1981 | Moses ........................................ 429/50 |
| 4,284,692 | 8/1981 | Rao et al. ................................. 429/194 |
| 4,345,010 | 8/1982 | Gluga ....................................... 429/197 |
| 4,401,735 | 8/1983 | Moses et al. ............................ 429/195 |
| 4,490,449 | 12/1984 | Moses et al. ............................ 429/196 |
| 4,526,846 | 7/1985 | Kearney et al. ......................... 429/194 |
| 4,680,241 | 7/1987 | Dyer ...................................... 429/50 X |
| 4,758,484 | 7/1988 | Furukawa et al. ....................... 429/194 |
| 4,853,305 | 8/1989 | Anderman et al. ................. 429/217 X |
| 4,959,282 | 9/1990 | Dahn et al. .............................. 429/224 |
| 4,980,251 | 7/1989 | Thackeray et al. ...................... 429/224 |
| 5,008,165 | 4/1991 | Schmöde .................................... 429/94 |
| 5,100,745 | 3/1992 | Earl ....................................... 429/50 X |
| 5,153,081 | 10/1992 | Thackeray et al. ...................... 429/194 |
| 5,166,012 | 11/1992 | Rossouw et al. ........................ 429/224 |
| 5,219,684 | 6/1993 | Wilkinson et al. ...................... 429/197 |
| 5,240,794 | 8/1993 | Thackeray et al. ...................... 429/224 |

FOREIGN PATENT DOCUMENTS

| | | |
|---|---|---|
| 2054253 | 2/1981 | United Kingdom . |
| 2083275 | 3/1982 | United Kingdom . |

OTHER PUBLICATIONS

Jrnl of Power Sources "Solutions of LiAsF$_6$ in 1,3 dioxolane . . . " by Y. Gofer, M. Ben–Zion and D. Aurbach, Oct. 31, 1991.

Jrnl of Power Sources "Ageing of Rechargeable Lithium Batteries . . . " by A. de Guibert and A. Hermelin, 14 (1985) 52–54 (Month N/A).

Primary Examiner—Stephen Kalafut
Attorney, Agent, or Firm—Weil, Gotshal & Manges

[57] ABSTRACT

A non-aqueous safe secondary cell is provided. The cell can be repeatedly charged and discharged retaining the excellent safety features. This cell comprises as main components a negative electrode which is Lithium or Lithium alloy, a positive cathode which includes MnO$_2$ and an electrolyte which is 1,3-Dioxolane with Lithium hexafluoroarsenate (LiAsF$_6$) and a polymerization inhibitor.

28 Claims, 6 Drawing Sheets

5,506,068

NON-AQUEOUS SAFE SECONDARY CELL

FIELD OF THE INVENTION

This invention relates to rechargeable electrochemical cells and, more particularly, to an advantageous combination of anode, cathode and electrolyte within such a cell.

BACKGROUND TO THE INVENTION

Rechargeable electrochemical cells, also known as secondary cells, typically include an anode, a cathode and an electrolyte. In many commercially available secondary cells the anode includes an alkali metal; the electrolyte is a solution containing an electrolytic salt which is usually an alkali metal as an anode; and the cathode includes an electrochemically active material, such as compound of a transition metal. During use, electrons pass from the anode through exterior connecting circuitry to the cathode and alkali metal ions from the anode pass through the electrolyte to the cathode where the ions are taken up, with the release of electrical energy. During charging, the flow of electrons and ions are reversed.

In the design of secondary cells two issues are of importance. On the one hand the cell must be safe; on the other hand the cell must have good performance, meaning that it must be able to produce energy and be capable of being cycled (charged and discharged) numerous times.

To meet the energy requirement of the secondary cells, the use of lithium as an anode material has been suggested. This is because it yields a cell having a very high energy density. That is, the cell that can store a substantial amount of electrical energy for a given size. Furthermore, manganese dioxide ($MnO_2$) and Li derivatives of manganese dioxide have been shown to be good cathode materials for such lithium-based cells as these materials provide a high electrochemical potential against lithium. Moreover, $MnO_2$ is inexpensive, environmentally friendly and readily available. As a result, considerable effort has been devoted to development of secondary $Li/MnO_2$ cells.

Although some lithium-based cells have also met the requirement of being capable of being cycled numerous times, they unfortunately have a number of problems in practical implementation. This is because these cells are not safe under abusive conditions such as overcharging, short circuiting or exposure to high temperature.

The basic problem with this type of secondary cell is the high reactivity of the lithium deposits, which are formed on the anode during cycling, with the electrolyte. Abusive operating conditions can increase the temperature and pressure within the cell.

This is a very hazardous condition and can lead to the splitting open of the cell, an event known as venting. This venting can range from venting accompanied by a mild flame; through venting which is accompanied by vigorous flames; and to venting in which there is a violent explosion. All these venting conditions pose a considerable safety risk.

As one attempt to solve the problem of the reaction between the anode and the electrolyte, an electrolyte containing propylene carbonate (PC) and ethylene carbonate (EC), with ethers, has been proposed. This PC/EC based electrolyte has, however, not provided a safe cell under abusive operating conditions.

A different attempt at solving the problem has been to provide a porous separator having a low melting point. The intention of this is that as the temperature inside the cell rises above the melting point of the material making up the separator, it will melt and block the pores. This would prevent the flow of ions between the cathode and anode and effectively terminate the current and consequently the raise in temperature. Unfortunately though, the melting points of these separators are too high and they are not effective in preventing the reaction of the lithium with the electrolyte.

From the above then, it is apparent that none of the proposals cited above is satisfactory and the need still exists for a high energy density lithium based secondary cell which can be safely cycled many times and which is also appropriately safe under the abusive operating conditions of high temperature, overcharging and short circuiting.

SUMMARY OF THE INVENTION

Accordingly this invention provides for a secondary electrochemical cell comprising a Lithium based negative electrode; a positive electrode including the compound $MnO_2$; and an electrolyte including an ionic salt and a solvent which is stable at temperatures below 100° C., but which polymerizes at temperatures greater than 100° C. and at voltages higher than 4 Volts. This polymerization increases the internal resistivity of the cell and thereby decrease the flow of current and, simultaneously, the temperature within the cell.

Typically, the ionic salt is a Lithium salt and has concentration in the dioxolane solvent from 0.5 mole per liter of solvent up to the saturation point. Preferably the salt is $LiAsF_6$ at concentrations between 0.8M to 1.5M per liter.

The positive electrode or cathode can be $MnO_2$ or lithiated $MnO_2$ and is preferably of the general formula $Li_xMnO_2$, with $x=0.30$ to $0.40$.

The electrolyte is preferably a member of the dioxolane family and should include a stabilizer which acts as a polymerization inhibitor. Typically the electrolyte includes 1,3 dioxolane and the stabilizer is a member of the tertiary amine group and typically is one of the group consisting of: Triethylamine, Tributhylamine, Tripropylamine, Tribenzylamine, Trioctylamine, Triphenylamine, methylpiperidine.

Stabilizers such as triethylamine, tributylamine and triphenylamine, are preferably added at concentrations of between 50 ppm (v/v) to 5 percent (v/v) while concentrations of 100 ppm (v/v) to 5000 ppm (v/v) of triethylamine and tributylamine were found to be the most effective.

A cell of this type has been found to be particularly advantageous as it is a high density lithium based secondary cell which can be safely cycled many times and which is also appropriately safe under the abusive operating conditions of high temperature, overcharging and short circuiting.

The present invention is described below and its details will no doubt become apparent to those skilled in the art after having read the following description of the invention which is illustrated in the several figures of the drawing.

DETAILED DESCRIPTION OF THE INVENTION

Figure 1:
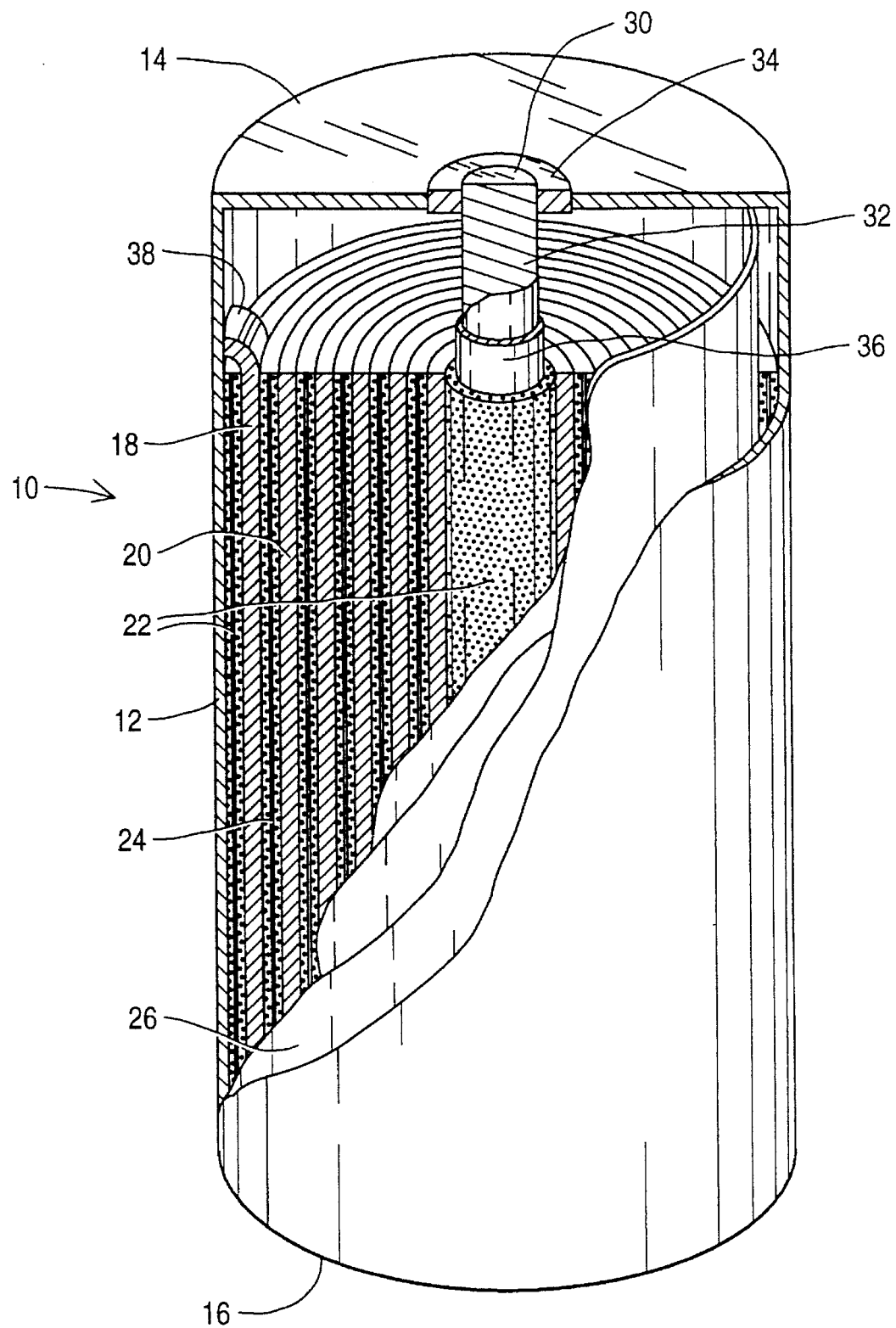
FIG. 1 is a schematic representation of an electrochemical secondary cell constructed according to the invention.

In FIG. 1 of the accompanying drawings, an electrochemical cell according to the invention is generally indicated by 10. The cell 10 is shown to include an outer casing 12, a cap 14 and a base 16. Inside the casing 12 an anode 18, cathode 20, electrolyte 22 and separator 24 are located in the form of a tightly wound roll 26.

The cap 14 is of standard industrial manufacture and includes an upstanding protrusion 30 which serves as the positive terminal of the cell. The protrusion 30 is the top of a downwardly extending molybdenum pin 32 which is supported by a glass insulator 34. As is indicated the pin 32 is connected to the cathode 20 by way of a tab 36 and the anode 18 connected to the casing 12 by a tab 38.

A typical AA size cell of this type of construction would be 50 mm long and have an outer diameter of 14 to 15 mm. The anode 18 and cathode 20 consist of 40 mm wide strips respectively about 300 mm and 250 mm long. Typically the strip making up the anode 18 is 160 um thick and that making up the cathode 20 is 250 um thick. The separator 24 is made of a porous strip about 700 mm long, 48 mm wide and about 25 um thick.

During manufacture of the cell, the separator 24 is folded lengthwise over the cathode 24 and this combination together with the anode 18 is wound tightly to produce a roll 26. The roll 26 is then covered in insulation and inserted into the casing 12. As the separator 24 is wider than the cathode, it protrudes beyond both the cathode and the anode and, in use, serves to prevent short circuiting between them. Once the roll 26 is located in the casing, the tabs 36, 38 are respectively connected to the pin 34 and casing 12, the remaining portion of the tab 36 insulated to prevent short circuit with the anode 18 and the cap 14 secured to the top of the casing. Electrolyte 22 is then vacuum injected into the casing 12 through an aperture (not shown) in its base 16 which is thereafter sealed off. As the electrolyte, which will be described in greater detail below, has a very low viscosity, it fills all the voids, including the pores in the separator and the cathode.

Turning now to the relevant components of the cell, these are described in greater detail below:

1. The Negative Electrode (anode)

The anode 18 is typically a thin laminate foil consisting of a copper layer sandwiched between two lithium layers. In the example of the AA cell given above, the copper layer is typically 20 um thick and the lithium layers each 70 um thick. This type of lithium based anode is known in the art and can be obtained commercially. Furthermore, it is also possible to use a pure Lithium anode.

2. The Positive Electrode (cathode)

The cathode 20 preferably contains an active material which is manganese dioxide ($MnO_2$) or lithiated $MnO_2$. Many different ways of producing this cathode active material are known.

For example, one way of producing an $MnO_2$ active material is disclosed in U. S. Pat. No. 4,133,856 (Ikeda, et al.). This patent teaches that gamma-phase manganese dioxide is heated for a period of at least 2 hours at a temperature of between 350° and 430° C. so that the $MnO_2$ is effectively dried and its structure changed from the gamma-phase to the beta-phase. This method is also referred to in U.S. Pat. No. 5,279,972 (Moses).

As indicated, the cathode active material can also include lithium, in which case it is preferable for the material to be lithiated manganese dioxide of the formula $Li_xMnO_2$.

One way of preparing this compound is disclosed in Matsushita's Japanese Kokai 62-20250 (1987) which suggests the synthesis of a lithium potassium permanganate of the general formula (1−x) $K_x$ $LiMnO_4$ followed by the thermal decomposition of the permanganate. This publication teaches that the decomposition products resulting from this process have stoichometric formulas of between $Li_{0.3}MnO_2$ and $Li_{0.8}MnO_2$.

Yet another method of producing a lithiated manganese dioxide cathode active material is described in Sanyo's U.S. Pat. No. 4,758,484 which was issued to Furukawa et. al. on Jul. 19, 1988. This method is described as selecting particulate $MnO_2$ having a particle size not greater than 30 um mixing it with a suitable lithium salt and heating the mixture in air at 375° C. Typical lithium salts mentioned are: LiOH; $LiNO_3$; $LiPO_3$; $Li_2CO_3$ and $Li_2O$. This patent discloses a number of different ratios to define the mixture of $MnO_2$ and lithium salt. Although this patent indicates that this method results in an active material of the formula, $Li_2MnO_3$, tests have shown that it in fact produces a material of the formula of $Li_x MnO_2$ where x is 0.3 to 0.4, a material which is also appropriate for use in the cells of this invention.

There are thus many ways of producing an appropriate cathode active material. This material, whatever the form, is typically in granular/powder form which must be mixed with a conductive agent such carbon black or graphite in amounts of between 5% to 10% by weight, and with a commercial binder. Many different types of binders are known. One type is an emulsion of Teflon® powder and water. This mixture can then be heated to make a putty which can be molded under heat and/or pressure.

It has also become common to mix a solvent in with the mixture of binder and cathode active material. As a result of the heat applied during the molding step, this solvent evaporates. Even so, it has the advantage of producing a better combination between the binder and active material and thus improves the performance of the cell in use. Generally, the solvent is added in quantities of about 70% w/w solvent to binder plus cathode material. The solvent can, for example, be propanol, ethanol, isopropanol or one of the family of alkanes such as $C_{10}H_{22}$ (decane), $C_9H_{20}$ and $C_{11}H_{24}$.

Finally, during the manufacture of the cathode, the mixture is rolled onto an aluminum grid and baked at about 250° to 320° C. for 0.2 to 4 hours. The temperature and timing of this step is, to a large degree, a matter of choice but it is important that sufficient heat be applied so that the binder sinters and binds with the active material, and that the solvent evaporates. In use the aluminum grid acts both as a support for the cathode material and as a collector for electrons.

The Electrolyte

The electrolyte 22 is important to the safe operation of the cell. It should include a solvent which is stable and which, together with a suitable ionic salt, forms a conductive solution at typical cell operating conditions. The solvent should, however, be such that it polymerizes in the cell so as described, above about 100° C. and at high voltages of above about 4 V. These conditions would typically be reached when the cell is overcharged at high currents or short circuited. This polymerization is very effective in that it substantially increases the resistivity of the cell and thereby terminates its operation and precludes the possibility of further hazardous reactions between the lithium and the electrolyte itself.

In a preferred embodiment of the invention, the electrolyte is constituted by a solution of a member of the dioxolane family and most preferably by 1,3-dioxolane, a lithium salt and a tertiary amine polymerization inhibitor (stabilizer). The concentration of the lithium salt in the dioxolane, can vary from 0.5 mole per liter of dioxolane up to the saturation point. However, the lithium salt of choice is lithium hexafluoroarsenate ($LiAsF_6$) at concentrations between 0.8 to 1.5 moles per liter. It has been found that 1,3-dioxolane in conjunction with an $MnO_2$: based cathode active material produces very good results. As will be shown in the experiments below, 1,3-dioxolane with the $LiAsF_6$ polymerizes at high voltages (above about 4.0) and/or under high temperatures (above about 100° C). It should be noted that although this advantageous result has only been observed in 1,3 dioxolane in the presence of a $MnO_2$ based cathode material, and more particularly when the lithium based ionic salt is $LiAsF_6$, it is conceivable that other combinations of electrode, solvent and salt may produce the same result.

Alternatively a different metal oxide such as a Cobalt oxide could be used in the cathode. Similarly ethers such as 2-methyl tetrahydrafuran could be used. An alternative anode could be lithium ion type of material. Whatever the combination of components used it is important that the electrolyte in combination with the other components will be stable at normal operating temperatures and when the Voltage across the cell is within the operating voltage window of the cell. In addition to this, the electrolyte, in combination with the other elements, must polymerize when the conditions are beyond the normal operating parameters. Accordingly, this invention should not be limited only to this combination.

The performance of the electrolyte can be enhanced by the use of a stabilizer which inhibits the polymerization of the electrolyte at operating temperatures. This stabilizer is typically one of the group of tertiary amines and preferably is one of the group consisting of: Triethylamine, Tributhylamine, Tripropylamine, Tribenzylamine, Trioctylamine, Triphenylamine, methylpiperidine. A concentration of 1000 ppm of stabilizer has been found to yield satisfactory results.

The Separator

The separator 24 functions to keep the cathode and anode apart to prevent short circuiting but is porous to allow the flow of ions across it. Many different separator materials are available commercially, for example the polypropylene separator which is sold under the designation 3402 by Hoechst Celanese.

Operation of the Cell:

The operation of the secondary cell 10 of this invention can be illustrated in the following examples which report the results of the experiments conducted:

Experiment 1:

A number of AA size cells of the invention containing a Li metal anode; a $Li_xMnO_2$ cathode; an electrolyte of 1,3 -dioxolane, 1 mole per liter $LiAsF_6$ and 1000 ppm v/v tributhylamine; and a polypropylene separator were used in this experiment.

Figure 2:
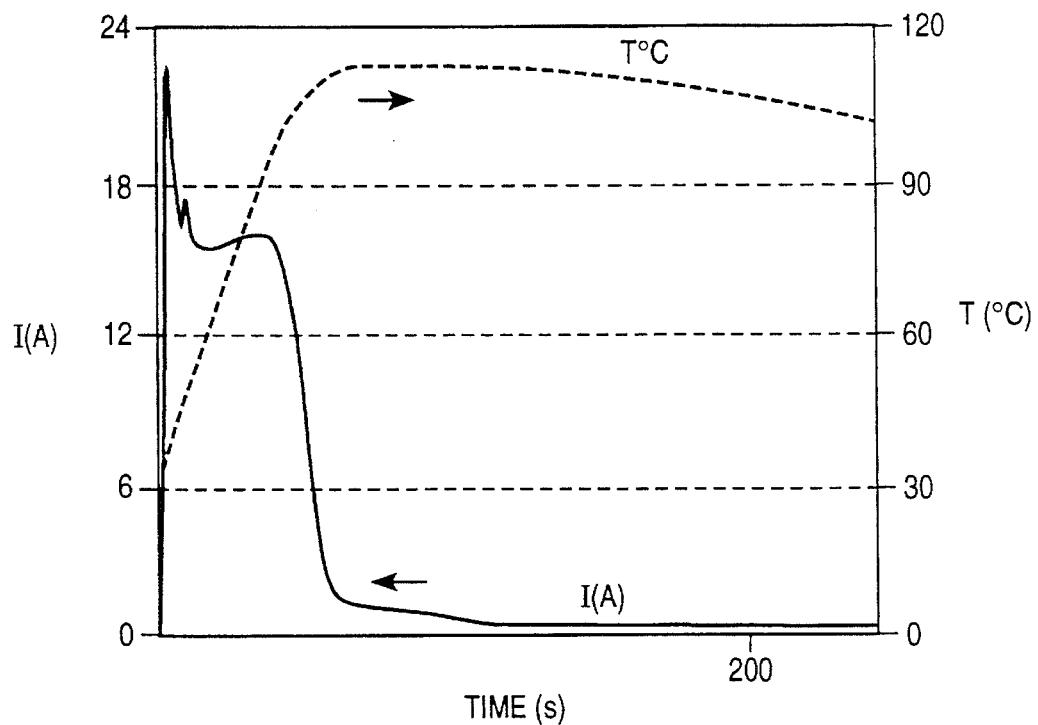
FIG. 2 graphs the behavior of the cell of the invention under short circuit conditions.

These cell were exposed to the short circuit condition of a 0.01 ohm resistance and the results plotted on FIG. 2. It can be seen from this figure that the temperature rise in the cells was limited to a maximum temperature of about 115° C. thereby preventing any hazardous venting.

Figure 3:
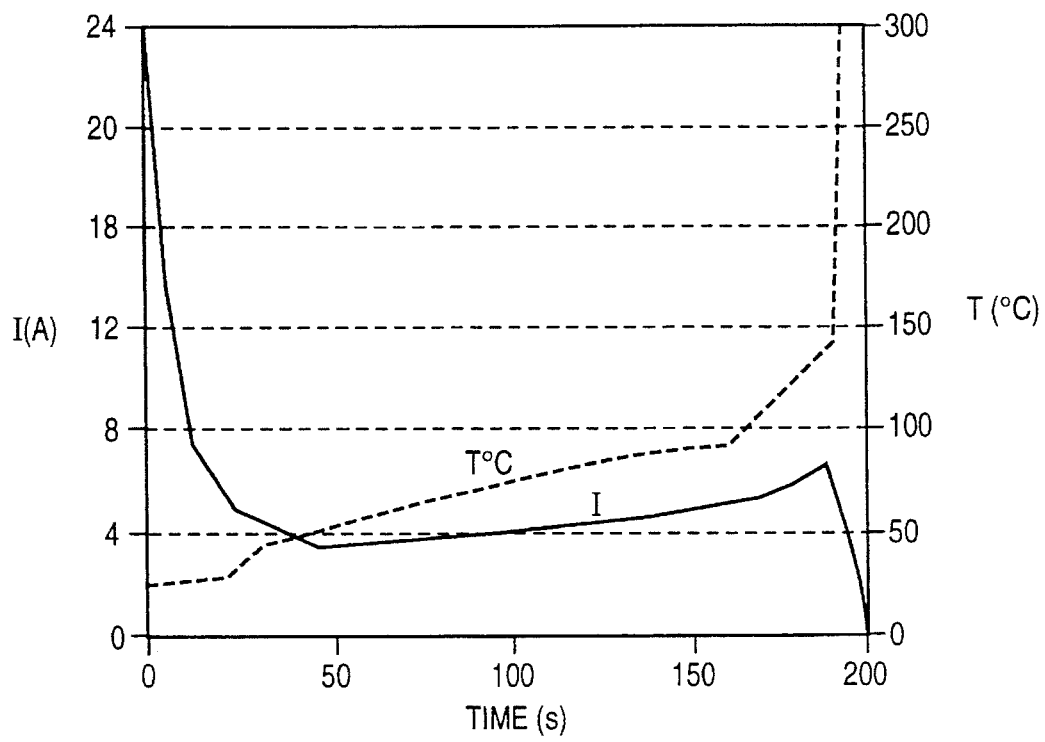
FIG. 3 illustrates a short circuit test of a prior art AA size, rechargeable $Li/Li_xMnO_2$ cell.

In contrast to this FIG. 3 illustrates the results of similar tests concluded on prior art cells. This figure shows very clearly how the temperature within the cell increased dramatically after reaching the 140° C. mark, thereby destroying the cell.

Figure 6:
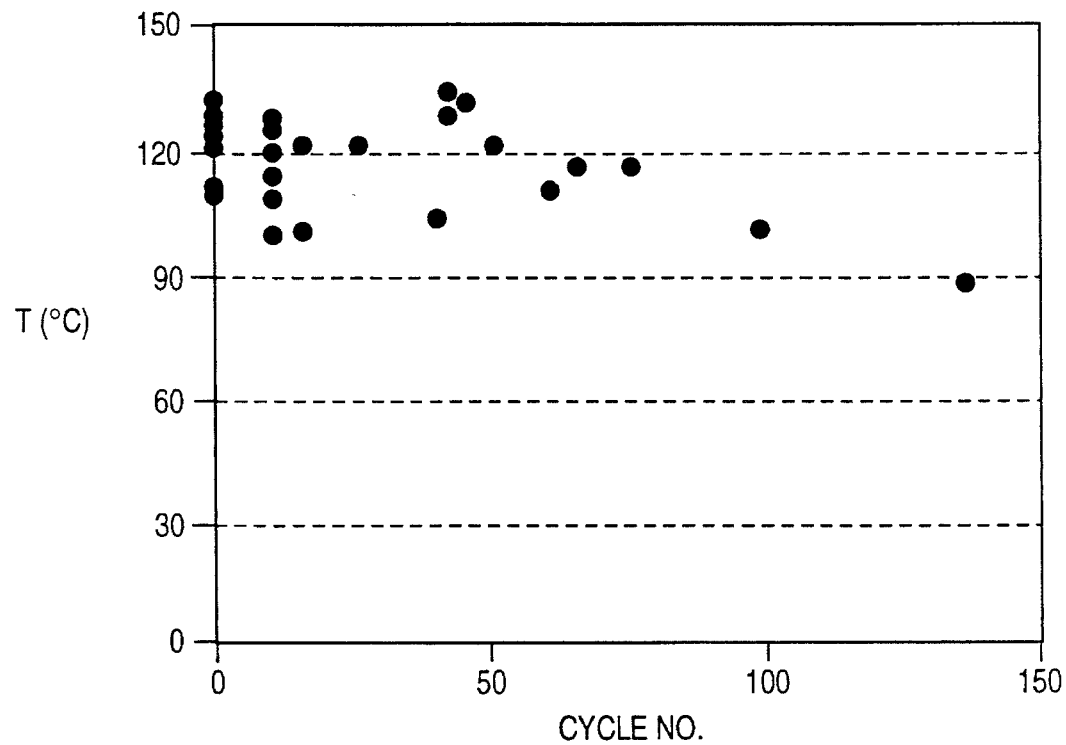
FIG. 6 illustrates an overcharge test of a prior art rechargeable Lithium AA size cell.

Experiment 2:

Charged cells similar to those used in Experiment 1 were exposed to short circuit conditions of 0.01 ohm resistance. Prior to the experiment, the cells were cycled (under extreme conditions) by discharging them at 40 to 250 mA and charging them at 60 to 250 mA. The internal temperature of each cell was monitored during the short circuit conditions. The readings are plotted in FIG. 6, against the number of cycles that the cell had previously been exposed to.

As can be seen the maximum temperature reached decreased with the number of cycles. this indicates that the cell is safer the more it has been cycled.

Figure 4:
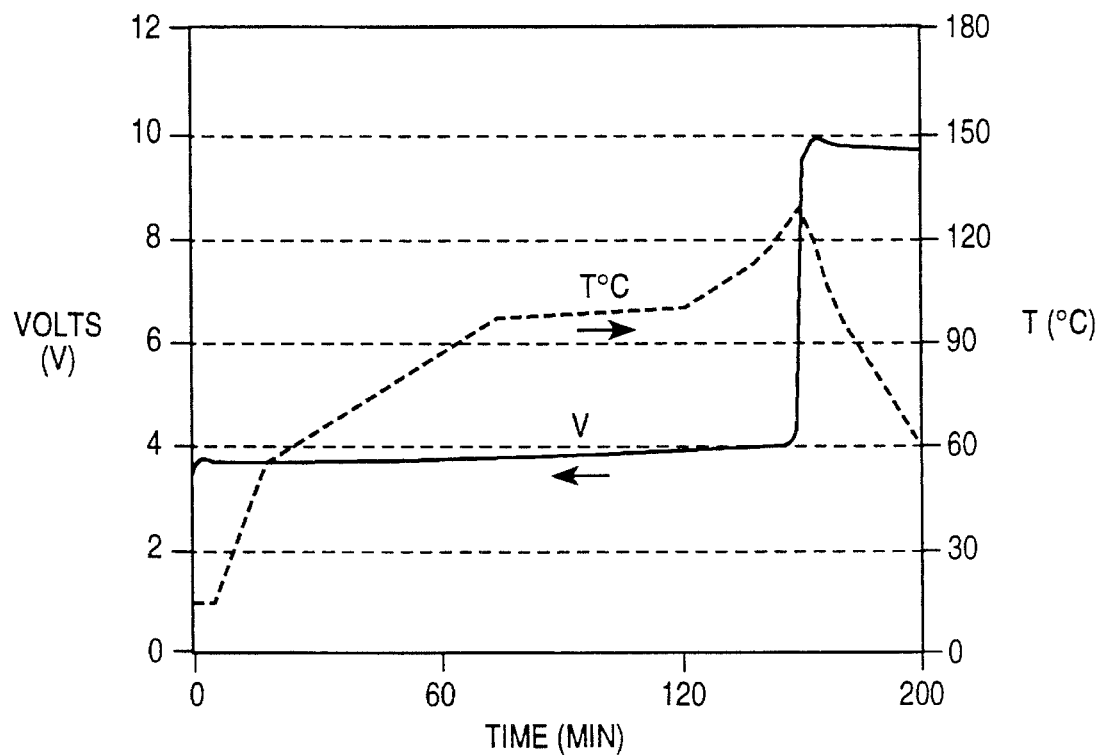
FIG. 4 graphs the maximum temperature of a cell, as a function of cycling life, for cells exposed to short circuit conditions.

Experiment 3:

FIG. 4 describes the behavior of the same type of cell as in Experiment 1 but this time exposed to overcharge conditions at a current of 1A. The cell had previously been cycled 50 times.

As can be seen, the charging voltage increased rapidly to more than 10 V when the cell voltage reached 4.1 V. This situation was reached after the cell was overcharged for 3 hours. Importantly, the temperature and the current (not shown) decreased at the same time the voltage increased. The cell was tested for a further 20 minutes and remained intact after this test.

Figure 5:
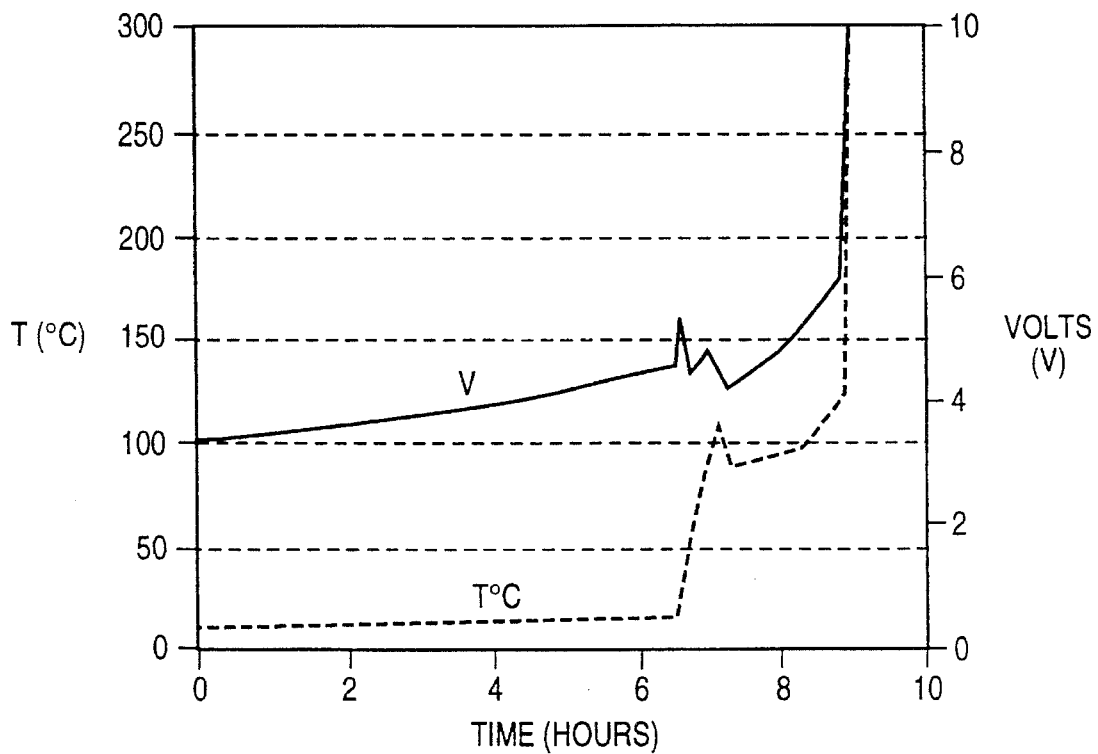
FIG. 5 plots the behavior of the above cell under conditions of overcharge at a current of 1A.

In contrast to this FIG. 5 shows the results of a similar experiment conducted on prior art cells. From this figure the failure of the cell and hazardous increase in temperature are clearly apparent.

Experiment 4

Figure 7:
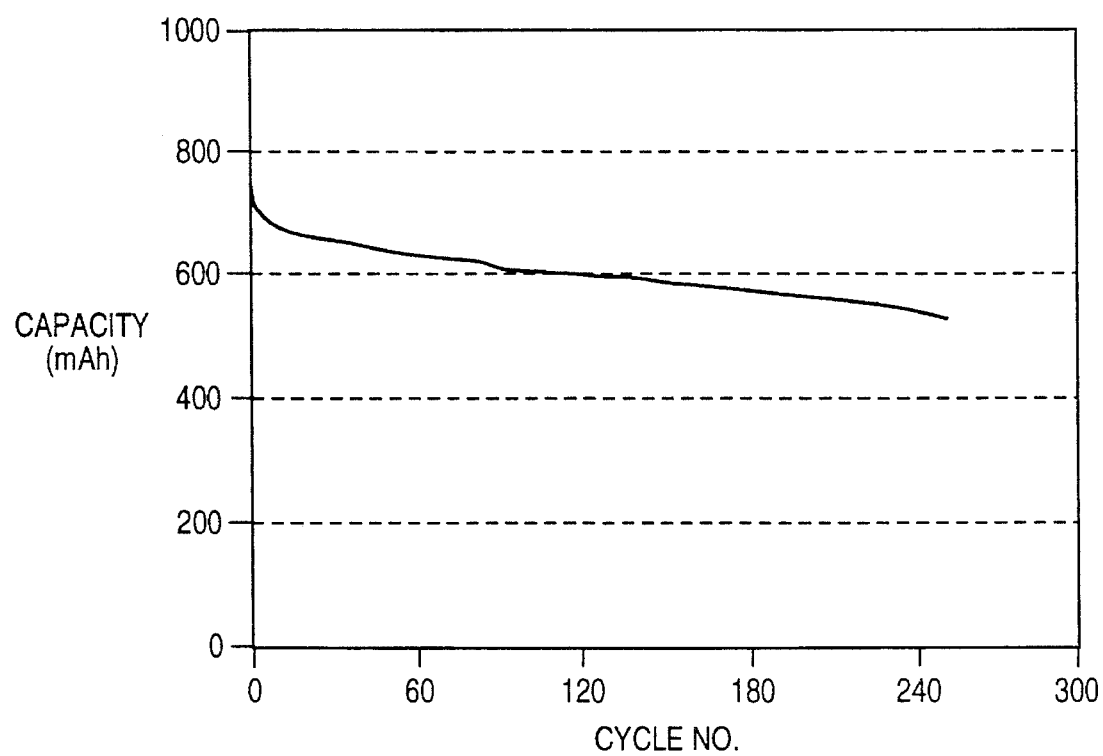
FIG. 7 is a graph plotting the results of an experiment conducted with a secondary cell of the invention which was repeatedly cycled.

Cells similar to those used in Experiment 1 were tested by repeated cycling. The results of this experiment are plotted on the graph in FIG. 7 which shows that the cells exhibited a long cycling life of more than 250 cycles. Moreover, even at cycle number 250 the cells were still able to deliver more than 75% of their nominal capacity.

Experiment 5: $Li/Li_xMnO_2$ Cells similar to those used above, but with two different electrolytes A and B, were tested for comparison purposes. Electrolyte A was a dioxolane/$LiAsF_6$/1000 ppm tributhylamine solution and electrolyte B a prior art EC/PC/$LiAsF_6$ solution.

Cells of both types were initially cycled at a charge rate of 60 mA and discharged at a rate of 250 mA. This type of cycling is typical of normal operating conditions. Thereafter the cell containing electrolyte A was charged at 250 mA and discharged at the same rate. The cell containing electrolyte B was charged at the more advantageous rate of 120 mA and also discharged at 250 mA per hour. Both cells were cycled between 2.0 and 3.4 V at these respective rates until they reached about 65% of their capacity.

Figure 8:
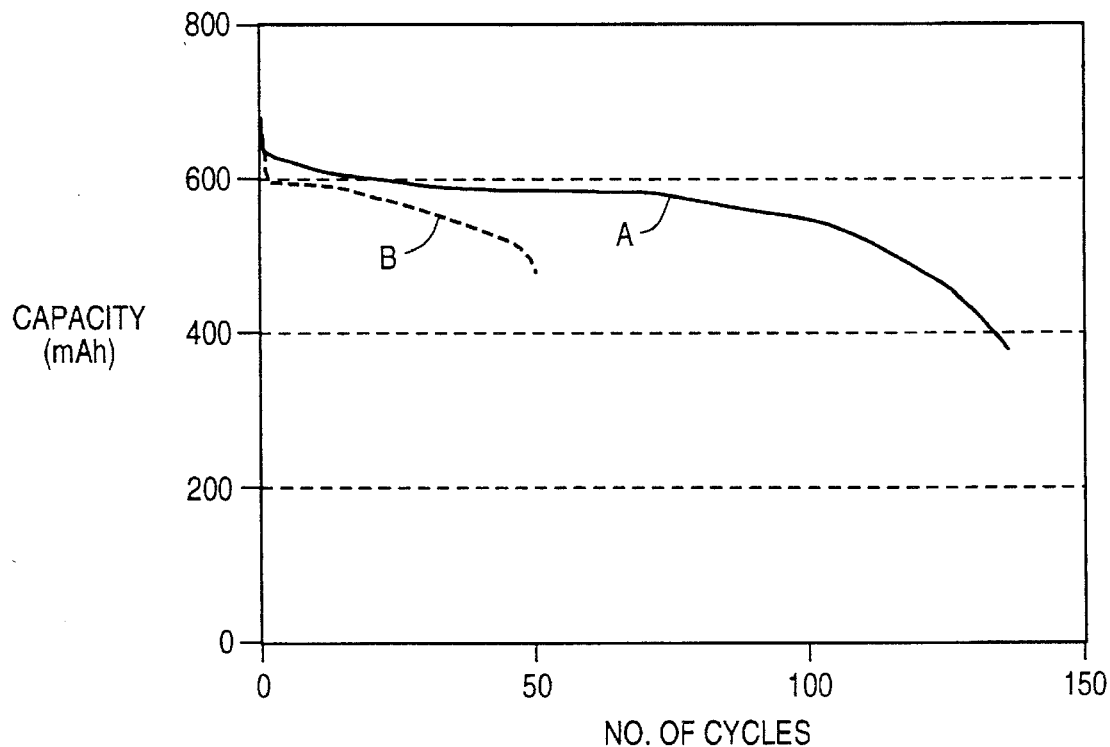
FIG. 8 compares the performance of cells with or without the electrolyte of the invention.

As can be seen from the results plotted in FIG. 8, cell A reached the end of its life, with 65% of the capacity it had after the second cycle, after 120 cycles. However, cell B was cycled only 50 times before developing short circuits and failing as a result of formation of dendrite bridges in the electrolyte.

It should be noted that this experiment also shows that the cell of this invention can be treated to increase its life expectancy when it is to be exposed to conditions of rapid charging (such as the tested charging rate of 250 mA). This can be achieved by first cycling the cell at the usually recommended normal rate, of 60 mA charge and 250 mA discharge, for about two to ten times. The optimum number of these cycles has yet to be determined, but it is believed that they should be sufficient to allow lithium to redeposit on the anode.

After this cycling, the cell can be rapidly charged as shown. Although this reduces its potential life from over 250 cycles to about 120 cycles, it is a substantial improvement over rapid charging without the initial slower charging steps (which would yield a life of less than 50 cycles even in the cell of this invention). It is furthermore anticipated that this method may also be applied to other secondary cells as well.

Experiment 6

Figure 9:
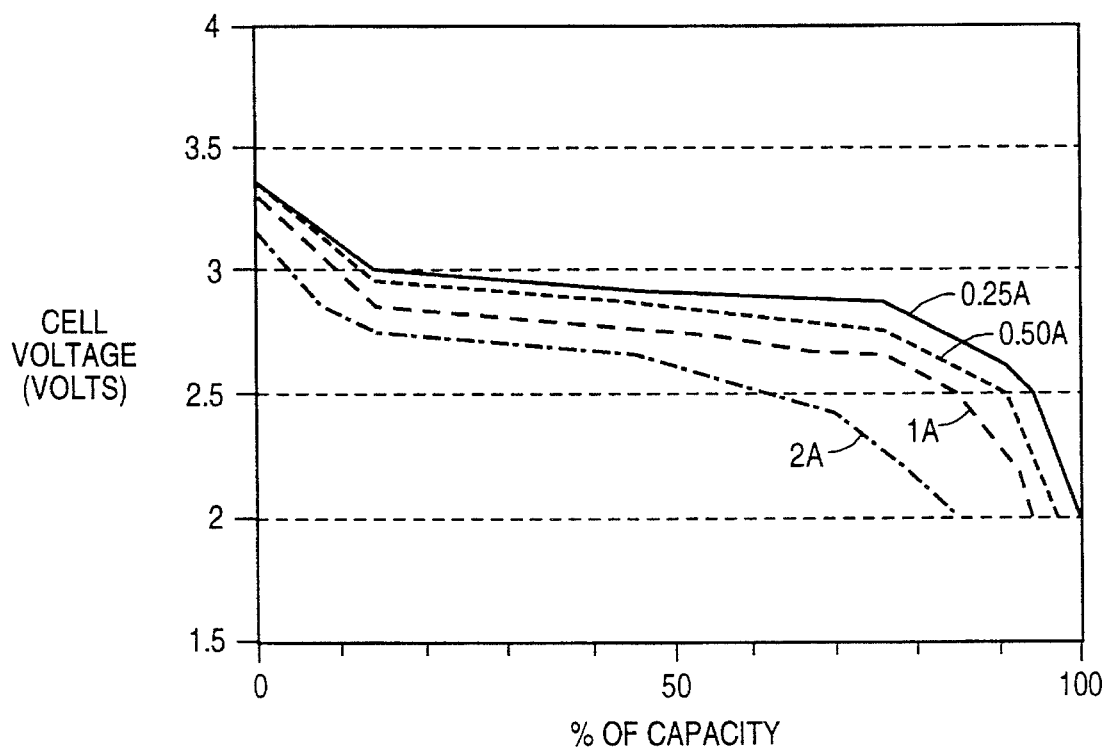
FIG. 9 graphically illustrates discharge tests done on the secondary cells of the invention.

The same cells as used in Experiment 1 were tested by discharging at the relatively high rates of 0.25 A, 0.5 A, 1 A and 2 A, respectively. As can be seen from the results of these tests, which are plotted on the graph of FIG. 9, the cells of the invention perform very well and retain a large percentage of their capacity.

Experiment 7

Figure 10:
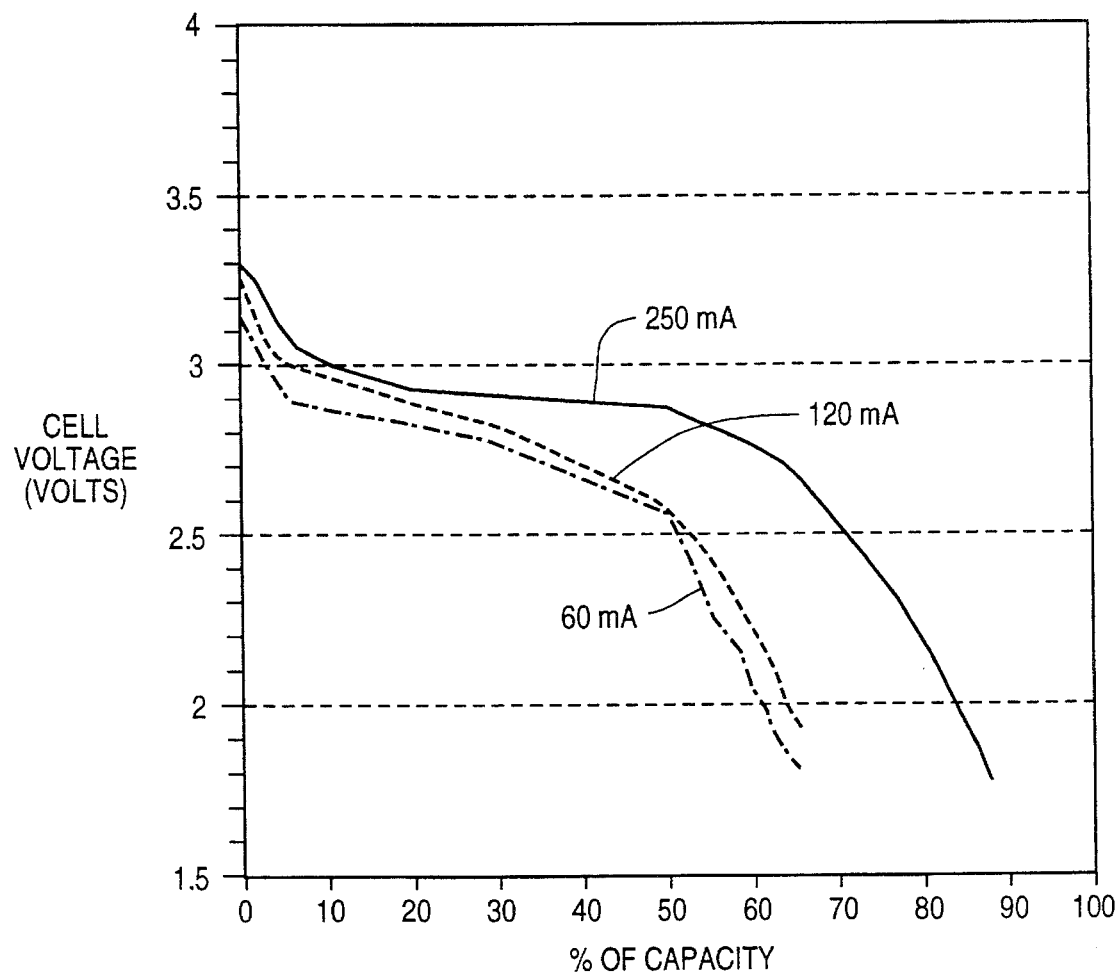
FIG. 10 graphically illustrates the capacity of secondary cells tested by discharging at low temperature.

In this experiment the same cells as used in Experiment 1 were discharged at the three different "low" temperatures of 0° C., −20° C. and −30° C. As can be seen from the results plotted in FIG. 10 the cells performed well at low temperature. The cells used delivered more than 60% at their room temperature (RT) capacity at −30° C. at a 60 mA rate of discharge.

Experiment 8:

A cell identical to the one used in Experiment 1 was tested at high temperature. The cell was placed inside an oven, in which a thermocouple was attached to the outer casing of the cell. The oven was heated at rate of 3° C. per minute. When the cell's can reached 128° C., it vented without noise, fire or any explosion. The cell had previously been cycled 120 cycles at 250 mA discharge and 60 mA charge.

In a manner similar to that of Experiment 1, a variety of cells were tested, using other members of the tertiary amine family defined above. Similar results were obtained. The amines were tested at various concentrations, and proved to be effective over a wide range of concentrations, from about 0.005 percent to about 5 percent. The best results were obtained at concentrations in the 0.01% to 0.3% range.

Furthermore, various concentrations of the lithium hexafluoroarsenate were tested. Good results were obtained using a concentration in the 0.5 mole/liter to 2.5 mole/liter range, with the best results at about 1 mole/liter.

From these experiments it can be concluded that the secondary cell of the invention performs well under the adverse conditions of high and low temperature, short circuit and overcharging. In addition, the cell is shown to be capable of being cycled many times. Also, the addition of the stabilizers gives the cell an added shelf life, even at temperatures of as high as 80° C.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An electrochemical cell comprising:

(i) a cathode including a metal oxide;

(ii) an anode; and (iii) an electrolyte solution which rapidly polymerizes at a temperature exceeding 100° C., and at voltages greater than the operating voltage window of the cell, for safely terminating operation of the cell before any venting occurs, by increasing the internal resistivity thereof.

2. The electrochemical cell of claim 1 wherein the metal oxide includes Manganese dioxide ($MnO_2$).

3. The electrochemical cell of claim 2, wherein the electrochemical cell is a secondary cell.

4. The electrochemical secondary cell of claim 3, wherein the anode includes lithium.

5. The electrochemical secondary cell of claim 4 wherein the cathode includes lithiated manganese dioxide of the general formula $Li_xMnO_2$ where x is from 0.30 to 0.40.

6. The electrochemical secondary cell of claim 3 wherein the electrolyte includes a member of the dioxolane family and an ionic salt of the material of the anode.

7. The electrochemical secondary cell of claim 6, wherein the electrolyte solvent is 1,3 dioxolane.

8. The electrochemical secondary cell of claim 7, wherein the ionic salt includes alkali metal salt.

9. The electrochemical secondary cell of claim 8, wherein the ionic salt is lithium hexafluoroarsenate ($LiAsF_6$).

10. The electrochemical secondary cell of claim 9, wherein the $LiAsF_6$ is present in a concentration of from 0.8 to 1.5 moles per liter.

11. The electrochemical secondary cell of any one of claims 7 to 10, wherein the electrolyte further includes a polymerization inhibitor.

12. The electrochemical secondary cell of claim 11, wherein the inhibitor is one of the family of tertiary amines.

13. The electrochemical secondary cell of claim 12, wherein the tertiary amine is one of the group consisting of: Triethylamine, Tributhylamine, Tripropylamine, Tribenzylamine, Trioctylamine, Triphenylamine, methylpiperidine.

14. The electrochemical secondary cell of claim 13, wherein the tertiary amine is at a concentration of from 50 ppm to 50 000 ppm.

15. The electrochemical secondary cell of claim 14, wherein the concentration of the tertiary amine is from 100 ppm to 5000 ppm.

16. The electrochemical secondary cell of claim 3 wherein the cathode is manufactured by a method including the steps of:

(i) mixing a particulate metal oxide with a binder, carbon and an alkane solvent; and (ii) rolling the mixture onto an aluminum grid and heating the mixture and grid to evaporate the solvent and to sinter and bind the remaining material.

17. The electrochemical secondary cell of claim 16 wherein the alkane solvent is decane.

18. The electrochemical secondary cell of claim 6 wherein said cell is charged to a voltage of at least 3.4 volts, and wherein said electrolyte solution rapidly polymerizes before any venting of the cell occurs if said cell is charged to a voltage of greater than 4 Volts.

19. A method of enhancing the operational life of an electrochemical secondary cell Containing a manganese dioxide based cathode, a lithium metal based anode, and a 1,3-dioxolane based electrolyte, which cell is to be exposed to charging conditions of greater than 150 mA rate, the method comprising the step of initially exposing the cell to a plurality of charge and discharge cycles, each such cycle having a charge rate of no greater than 100 mA and a discharge rate of no smaller than 200 mA.

20. A method of producing a cathode for an electrochemical cell comprising the steps of:
  (i) mixing a particulate cathode active material with a binder, carbon and an alkane solvent;
  molding the mixture into a shape on a conductive grid; and
  heating the mixture to evaporate the solvent and to sinter and bind the remaining material.

21. The method of claim 20, wherein the solvent is decane.

22. The method of claim 21, further comprising the step of applying the mixture to an electron conductive support material.

23. The method of claim 22, wherein the support material is Aluminum.

24. An electrolyte for use in an electrochemical secondary cell comprising:
  (i) a solvent being a member of the dioxolane family;
  (ii) $LiAsF_6$ in a concentration of between 0.8 and 1.5 moles per liter; and
  (iii) a tertiary amine polymerization inhibitor at a concentration of greater than 500 ppm;
said electrolyte being stable when present in a cell having an anode comprising lithium and a $MnO_2$ based cathode, said cell having a stable operating voltage of at least 3.4 volts, said electrolyte rapidly polymerizing at a temperature above 100° C. and if said cells charged to a voltage exceeding 4 volts.

25. An electrolyte according to claim 24 wherein the solvent is 1,3 dioxolane and the $MnO_2$ based cathode of said cell lithiated.

26. An electrochemical cell comprising:
  (i) a manganese dioxide ($MnO_2$) based cathode;
  (ii) an anode including lithium; and
  (iii) an electrolyte solution which rapidly polymerizes at a temperature exceeding 100° C. and at voltages greater than the operating voltage window of the cell, for safety terminating operation of the cell without any venting thereof by increasing the internal resistivity of the cell, the electrolyte solution comprising:
    (A) a solvent including a member of the dioxolane family;
    (B) lithium hexafluoroarsenate ($LiAsF_6$) in the concentration of from 0.8 to 1.5 moles per liter; and
    (C) a tertiary amine polymerization inhibitor.

27. The electrochemical cell of claim 26 wherein the polymerization inhibitor is at a concentration of from 100ppm to 5000 ppm.

28. The electrochemical cell of claim 26 wherein the lithium hexafluoroarsenate is in the concentration of about 1 mole per liter.

* * * * *